(No Model.)
H. WALLACE.
AXLE SPINDLE AND BOX.
No. 461,226. Patented Oct. 13, 1891.
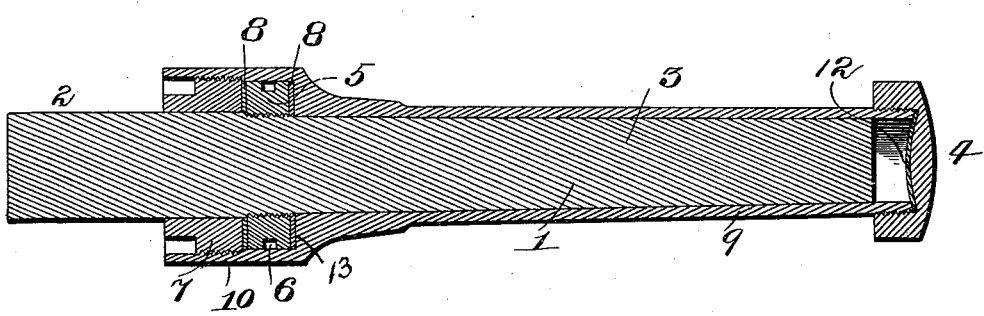
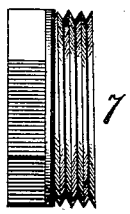
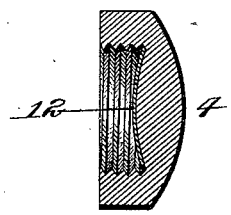
WITNESSES:
INVENTOR:
Henry Wallace,

UNITED STATES PATENT OFFICE.

HENRY WALLACE, OF PARIS, ILLINOIS, ASSIGNOR OF ONE-HALF TO OSCAR T. MERKLE, OF SAME PLACE.

AXLE SPINDLE AND BOX.

SPECIFICATION forming part of Letters Patent No. 461,226, dated October 13, 1891.

Application filed April 14, 1891. Serial No. 388,880. (No model.)

*To all whom it may concern:*

Be it known that I, HENRY WALLACE, a citizen of the United States, and a resident of Paris, in the county of Edgar and State of Illinois, have invented certain new and useful Improvements in Spindles and Boxing for Vehicles; and I do hereby declare that the following is a full, clear, and exact description of the invention, which will enable others skilled in the art to which it appertains to make and use the same, reference being had to the accompanying drawings, which form a part of this specification.

My invention relates to vehicle-axles, the object being to provide an improved construction of same with especial reference to preventing dust and dirt from getting into the spindle and boxing.

The invention consists in the novel construction and combination of parts hereinafter fully described, and specifically pointed out in the claim.

In the accompanying drawings, Figure 1 is a sectional elevation of a vehicle axle and box made in accordance with my invention. Fig. 2 is a view of the tap detached. Fig. 3 is a view of the box closing and tightening nut detached.

In the said drawings the reference-numeral 1 designates an axle of any ordinary construction, having the usual squared portion 2 and spindle 3, with screw-threaded end to receive the box closing and tightening nut 4. This spindle is provided with a collar 5, having a peripheral groove 6, and is firmly secured to the spindle near the squared portion 2. Intermediate of this squared portion and the collar is a loose screw-tap 7, consisting of a metallic annulus provided with peripheral screw-threads at its outer end and having its opposite end made angular, so as to permit of its being actuated by a wrench or other instrument.

The numerals 8 8 designate leather or other washers upon each side of the collar.

The numeral 9 designates the boxing, having an annular flange 10 at its inner end screw-threaded to receive the tap 7. It is also screw-threaded at its outer end to receive a box closing and tightening nut 4, which consists of a metallic cap screw-threaded upon its interior to engage with the end of the boxing and having its inner face made convex and provided with a washer 12.

The operation will be readily understood. The box is placed upon the spindle, and by actuating or turning the tap it will engage with the inner screw-threads in the box, the collar 5 being pressed up close against the shoulder 13 in the box. The box closing and tightening nut is screwed on the box.

The above construction possesses advantages which will be readily apparent to those skilled in the art to which the invention pertains. There is but very little, if any, liability of dust or dirt entering in between the axle and box, the escape of oil is prevented, and the box can be removed from the spindle with ease and facility.

Having thus described my invention, what I claim as new, and desire to secure by Letters Patent of the United States, is—

The combination, with the axle having the squared portion and the spindle, the collar having a peripheral groove fixed to the axle, and the loose tap having peripheral screw-threads mounted on the spindle intermediate of the collar and squared portion of the axle, of the box closing and tightening nut, the boxing, and the interposed washer, substantially as described.

In testimony that I claim the foregoing as my own I have hereunto affixed my signature in presence of two witnesses.

HENRY WALLACE.

Witnesses:
A. RISSER,
R. G. SUTHERLAND.